United States Patent [19]

Bahnemann et al.

[11] Patent Number: 4,779,974
[45] Date of Patent: Oct. 25, 1988

[54] CONTRAST RANGE INDICATOR

[75] Inventors: Volker W. Bahnemann, Greenwich, Conn.; Stanislaw Loth, Nanuet, N.Y.

[73] Assignee: Arriflex Corporation, Blauvelt, N.Y.

[21] Appl. No.: 114,779

[22] Filed: Oct. 30, 1987

[51] Int. Cl.$^4$ ............................................. G03B 1/60
[52] U.S. Cl. .................................... 352/171; 355/68; 355/71
[58] Field of Search ................. 352/170, 171; 355/71, 355/68

[56] References Cited

U.S. PATENT DOCUMENTS

| | | | |
|---|---|---|---|
| 2,183,217 | 12/1939 | Goldsmith | 352/171 |
| 2,460,060 | 1/1949 | Butler | 355/71 |
| 2,809,552 | 10/1957 | Ciavola | 355/71 |
| 4,101,217 | 7/1978 | Fergg et al. | 355/38 |

Primary Examiner—Monroe H. Hayes
Attorney, Agent, or Firm—Toren, McGeady & Associates

[57] ABSTRACT

An apparatus for indicating the contrast range in a scene to be photographed arranged to be situated within the field of view of a viewfinder of a camera. The apparatus includes a plurality of matching fields of respectively differing gray scale reflectance and a light source for illuminating the matching fields to an extent substantially similar to that of the scene to be photographed. By comparing the dark and light areas of the scene with the matching fields, a photographer is able to directly determine the contrast range of the scene and, if necessary, to adjust the same for the desired purpose.

9 Claims, 2 Drawing Sheets

CONTRAST RANGE INDICATOR

BACKGROUND OF THE INVENTION

1. Field of the Invention

The subject invention relates to apparatus for indicating the contrast range in a scene to be photographed.

2. Description of Related Art

In motion picture photography, a gray scale, exposed at the same light level as the scene to be photographed, is commonly used to determine the exact contrast range of the film chain, from exposure to developing to printing. A contrast range of 100:1 is reproducible and an object no darker than the black field of the appropriate gray scale and no brighter than the white field, will be correctly reproduced on film.

Methods to determine contrast range with light meters are not accurate and are impractical to use, since they can only measure either the overall scene light or individual reflected values but not the contrast relationship of all elements. To place gray scales at all points within the scene is also impractical and any evaluation would be impaired by the relative size differences resulting from the varying distances to the observer.

SUMMARY OF THE INVENTION

An object of the invention is to provide an apparatus for readily indicating the contrast range in a scene to be photographed.

Another object of the invention is to provide an apparatus for readily indicating the contrast range in a scene when the apparatus is located in front of a camera lens and "black" and "white" fields, illuminated by a key light, can be matched in the viewfinder with objects from the scene.

The above objects are achieved in a contrast range indicator having a plurality of fields representing various portions of the gray scale, means for illuminating said plurality of fields at a level substantially similar to that in the scene to be photographed, and means for suspending said contrast range indicator in front of a camera slightly within the field of view thereof.

The contrast range indicator is a device which contains the appropriate gray scale elements and an illuminating source that can be matched precisely to that which is used for illuminating the scene. Thus, when placed immediately in front of the camera lens and within the field of view which includes the scene to be photographed, the device appears together with the scene in the viewfinder image. At this point, the relative size of the scene matches that of the gray scale and the illuminating source of the indicator appears the same as the scene light, making it very easy to compare all of the elements in the scene to the contrast chart.

Using interchangeable gray tone elements and various filters, the indicator can be adapted to any lighting condition, ranging from "night scenes" to bright daylight and to contrast ranges 10:1 to 1000:1.

A contrast range indicator of the above type is particularly advantageous when used with a contrast range adjusting apparatus, for example, the Lightflex contrast range adjusting apparatus made by Arriflex, the assignee of the subject invention.

BRIEF DESCRIPTION OF THE DRAWINGS

With the above and additional objects and and advantages in mind as will hereinafter appear, the invention will be described with reference to the accompanying drawings, in which:

FIG. 2A is a top plan view, partly in section, of the contrast range indicator of the subject invention, while

DESCRIPTION OF THE PREFERRED EMBODIMENT

Figure 1:
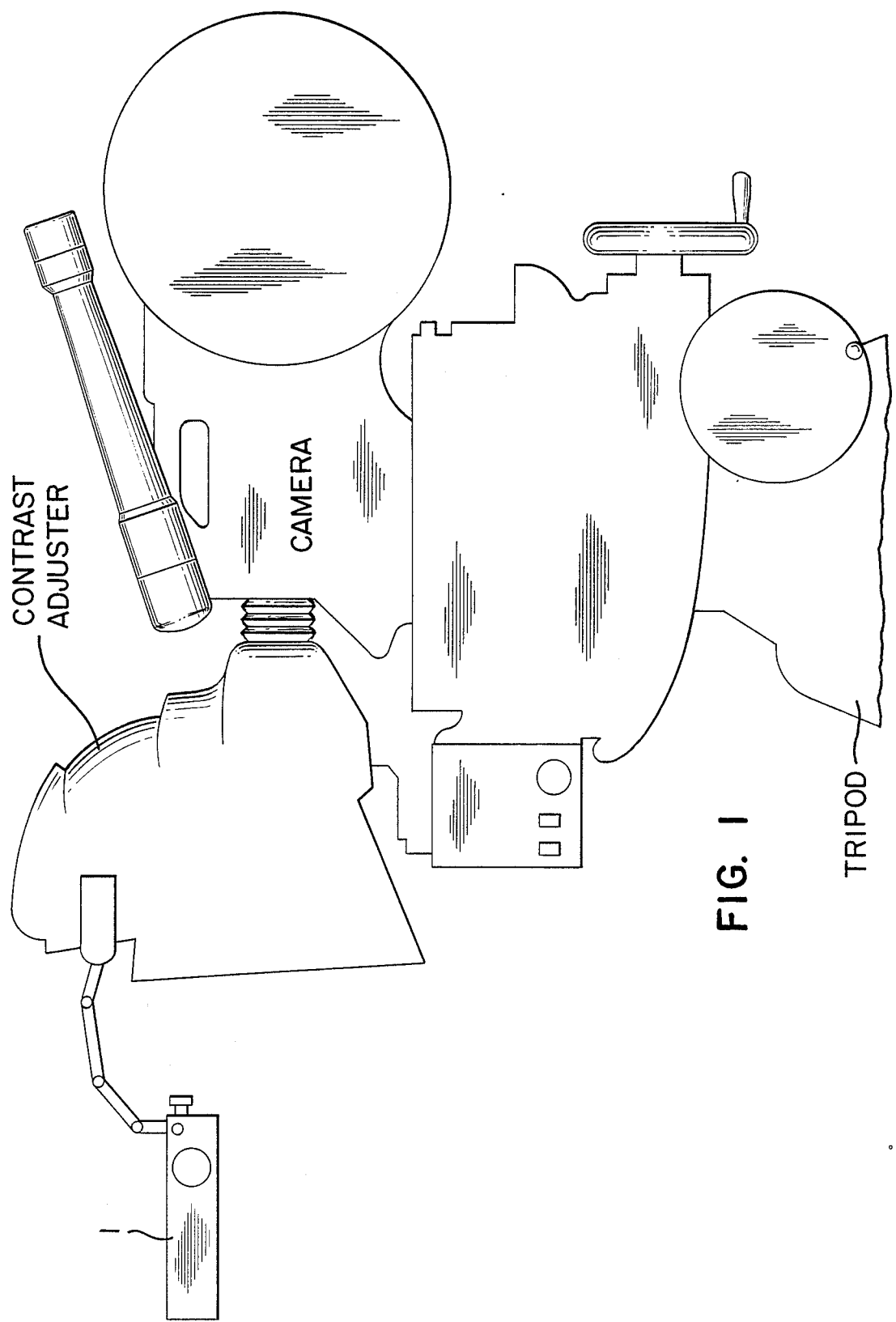
FIG. 1 shows an arrangement of a camera having a contrast range adjusting apparatus mounted thereon along with the contrast range indicator of the subject invention.
Figure 2A:
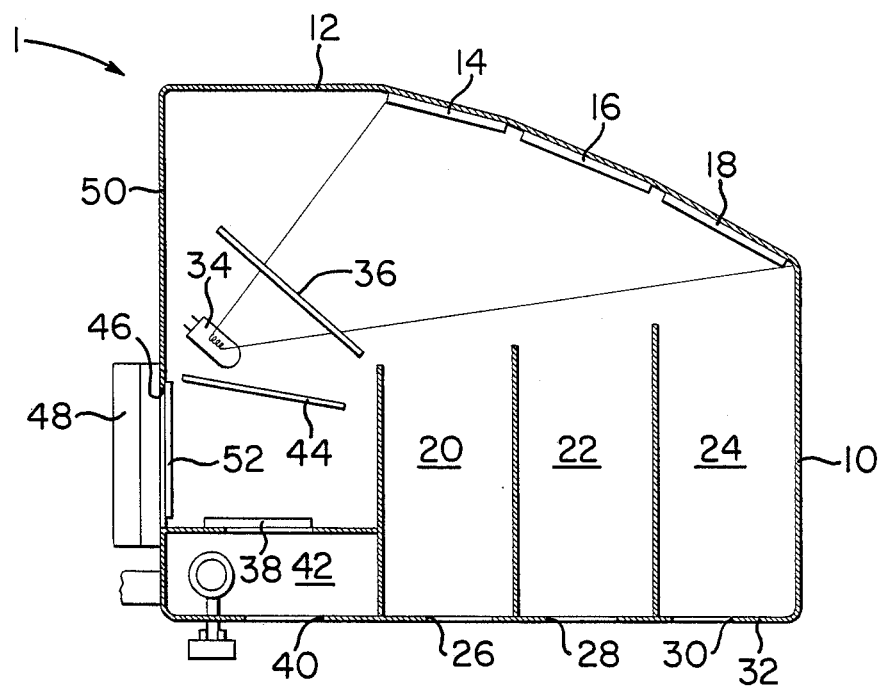

As shown in FIG. 2A. the contrast range indicator 1 is arranged in a housing 10 for shielding the indicator from ambient light. Along a rear wall 12 of the housing 10 are arranged a "face" matching field 14, a dark gray matching field 16 and a black matching field 1B. These fields 14–18 are varyingly reflective to light. Arranged oppositely to these fields 14–18 and spaced therefrom are viewing channels 20, 22 and 24 which have apertures 26, 28 and 30, respectively, formed in a front wall 32 of the housing 10 through which the photographer may view the fields 14–18.

The contrast range indicator 1 further includes a light source 34 for illuminating the fields 14–18. A variable power supply (not shown) is connected to the light source 34 for varying the light output of the light source 34. Depending on the illumination in the scene being photographed, since the light source 34 is adjusted the simulate this illumination, an interchangeble color compensating filter 36 is arranged between the light source 34 and the fields 14–18 to balance the color temperature of the light source 34 to the light of the scene.

A light transmissive "white" matching field 38 is arranged in front of an aperture 40 forming an additional viewing channel 42. This field 38 is illuminated by the light source 34 through a "white" field filter 44 which is a "milky" diffusion filter. An aperture 46 having a removable cover 48 is provided in a side wall 50 of the housing 10 between the filter 44 and the field 38 allowing the selective coupling of a light meter (not shown) for measuring the amount of light being emitted by the light source 34. A light meter filter 52 may be positioned over the aperture 46.

The "white" matching field 38 is equivalent to a gray scale of 90% reflectance; the "face" matching field 14 is a medium white field equivalent to a gray scale of 60% reflectance; the dark gray matching field 16 is equivalent to a gray scale of 1.6% reflectance; and the black matching field 18 is equivalent to a gray scale of 1% reflectance. The contrast range relationship of the above figures are as follows:

"white" to "dark gray"—1:60
"white" to "black"—1:100

Figure 2B:
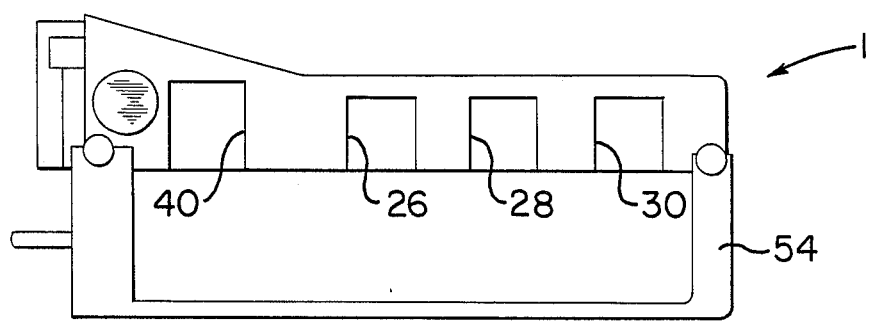
FIG. 2B is a front plan view of the contrast range indicator.

The contrast range indicator 1 allows the adjustment of light levels from 4 to 225 footcandles. When higher light levels are required in the scene, the contrast range indicator 1 includes an external filter frame 54, as shown in FIG. 2B into which a X10 or an X100 filter may be inserted. As shown, this filter underlies the viewing apertures 26–30 and 40 and effectively reduces the intensity of the scene illumination in the area immediately below the contrast range indicator 1, thus effectively extending the range thereof.

Figure 3:
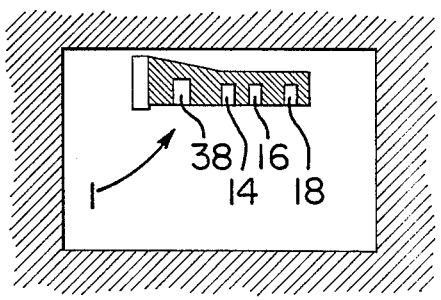
FIG. 3 is an illustration of a viewfinder image showing the contrast range indicator in the upper portion thereof.

When looking through the camera viewfinder, the contrast range indicator 1 is positioned at the upper edge of the viewing field as shown in FIG. 3. In operation, the light in the scene to be photographed is measured using a light meter. The contrast range indicator 1 is then adjusted to this measured light value by removing the cover 48 from the aperture 46 and inserting the light meter therein taking care that there is no leakage of ambient light into the contrast range indicator 1. The light source 34 is then energized and the power thereto adjusted until the illumination as measured by the light meter matches that measured for the scene. The light meter is then removed and the cover 48 is replaced over the aperture 46. The lens of the camera is then stopped down close to its end causing the image in the viewfinder to appear dark but still allowing the evaluation of the darkest areas in the scene. The contrast range of the scene is evaluated by comparing it to the two darkest fields of the contrast range indicator 1. Depending on the particular needs, the darkest areas should have a reflectance between the two darkest fields of the contrast range indicator 1. In the same way, the "white" matching field 38 of the contrast range indicator 1 is compared with the "whites" of of the scene. Objects which are darker than the black matching field 18 of the contrast range indicator 1 are under exposed, while those which are brighter than the "white" matching field 38 are under exposed. Direct evaluation of the contrast range of the scene without the indicator 1 is impossible because the contrast range acceptance of the human eye is approx. 1000:1, while that of film is approx. 100:1.

While the contrast range indicator 1 includes four matching fields 14–18 and 38, it should be apparent that any number of of additional fields may be added as desired.

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. A contrast range indicator comprising:
   a housing;
   a plurality of matching fields representing differing reflectances on a gray scale;
   means for variably illuminating said plurality of matching fields; and
   a plurality of apertures respectively situated opposite said plurality of matching fields for enabling a photographer to compare said fields to a scene to be photographed.

2. A contrast range indicator as claimed in claim 1, wherein said plurality of matching fields includes a white matching field, and said contrast range indicator further includes a color compensation filter situated between said illuminating means and said plurality of matching fields other than said white matching field.

3. A contrast range indicator as claimed in claim 2, which further comprises a white matching filter situated between said illuminating means and said white matching field.

4. A contrast range indicator as claimed in claim 1, which further comprises a filter frame attached to said housing and underlying said plurality of apertures for receiving filters for effectively reducing the light level in the scene to be photographed immediately adjacent to said contrast range indicator thereby extending the range thereof.

5. A contrast range indicator as claimed in claim 1, wherein said plurality of matching fields include a white matching field, a medium white matching field, a dark gray matching field and a black matching field.

6. A contrast range indicator as claimed in claim 3, which further comprises an aperture having a removable cover therefor located in a side wall of said housing between said white matching filter and said white matching field for selectively receiving a light meter.

7. A contrast range indicator as claimed in claim 1, wherein said matching fields are half transparent filters having different light densities from white to black adjusted by neutral density filters.

8. A contrast range indicator as claimed in claim 1, wherein said indicator is incorporated in a camera viewfinder system or aperture plate.

9. A contrast range indicator as claimed in claim 1, wherein said indicator is independently hand held.

* * * * *